US011393219B2

(12) United States Patent
Chen et al.

(10) Patent No.: US 11,393,219 B2
(45) Date of Patent: Jul. 19, 2022

(54) METHOD AND APPARATUS FOR DETECTING OBSTACLE, ELECTRONIC DEVICE, VEHICLE AND STORAGE MEDIUM (71) Applicant: BAIDU ONLINE NETWORK TECHNOLOGY (BEIJING) CO., LTD., Beijing (CN)

(72) Inventors: Dongming Chen, Beijing (CN); Xun Sun, Beijing (CN); Liang Wang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 355 days.

(21) Appl. No.: 16/584,051

(22) Filed: Sep. 26, 2019

(65) Prior Publication Data
US 2020/0104612 A1 Apr. 2, 2020

(30) Foreign Application Priority Data

Sep. 27, 2018 (CN) .......................... 201811131724.4

(51) Int. Cl.
G06V 20/58 (2022.01)
G06T 7/62 (2017.01)
(Continued)

(52) U.S. Cl.
CPC .......... *G06V 20/58* (2022.01); *G01S 7/4802* (2013.01); *G01S 17/42* (2013.01); *G01S 17/931* (2020.01);
(Continued)

(58) Field of Classification Search
CPC ............ G06K 9/00805; G06K 9/6218; G06K 9/6257; G06K 9/6262; G06K 9/629;
(Continued)

(56) References Cited

U.S. PATENT DOCUMENTS 6,487,303 B1 * 11/2002 Yamaguchi ............... G06T 7/74
382/103
2003/0227378 A1 * 12/2003 Nakai ................ G06K 9/00805
340/435
(Continued)

FOREIGN PATENT DOCUMENTS

CN 104287946 A 1/2015
CN 104636763 A 5/2015
(Continued)

OTHER PUBLICATIONS

Chinese Patent Application No. 201811131724.4 English translation of Office Action dated Aug. 26, 2020, 8 pages.
(Continued)

*Primary Examiner* — Michael R Neff
(74) *Attorney, Agent, or Firm* — Lathrop GPM LLP (57) ABSTRACT

Embodiments of the present disclosure disclose a method and an apparatus for detecting an obstacle, an electronic device, a vehicle and a storage medium. The method includes: obtaining a depth map around a vehicle; performing a terrain fitting based on the depth map to determine a terrain equation; determining a set of candidate obstacle points based on the terrain equation and the depth map; clustering candidate obstacle points in the set of candidate obstacle points to obtain at least one independent obstacle; and identifying and filtering a falsely detected obstacle from the at least one independent obstacle to obtain a depth-map-based obstacle detection result.

16 Claims, 4 Drawing Sheets (51) Int. Cl.
*G06T 7/50* (2017.01)
*H04N 13/271* (2018.01)
*G01S 17/931* (2020.01)
*G01S 7/48* (2006.01)
*G01S 17/42* (2006.01)
*G06K 9/62* (2022.01)
*H04N 13/00* (2018.01)

(52) U.S. Cl.
CPC ........... *G06K 9/629* (2013.01); *G06K 9/6218* (2013.01); *G06K 9/6257* (2013.01); *G06K 9/6262* (2013.01); *G06T 7/50* (2017.01); *G06T 7/62* (2017.01); *H04N 13/271* (2018.05); *G06T 2207/10028* (2013.01); *G06T 2207/30261* (2013.01); *H04N 2013/0081* (2013.01)

(58) Field of Classification Search
CPC ... G06T 7/62; G06T 7/50; G06T 2207/10028; G06T 2207/30261; H04N 13/271; H04N 2013/0081; G01S 17/931; G01S 7/4802; G01S 7/42
USPC .......................................................... 382/104
See application file for complete search history.

(56) References Cited

U.S. PATENT DOCUMENTS

| | | | |
|---|---|---|---|
| 2007/0156286 A1* | 7/2007 | Yamauchi | G05D 1/0251 700/245 |
| 2010/0030473 A1 | 2/2010 | Au et al. | |
| 2010/0054541 A1* | 3/2010 | Chen | G08G 1/166 382/107 |
| 2017/0261603 A1 | 9/2017 | Jachmann | |
| 2019/0051007 A1* | 2/2019 | Pohl | G06T 7/55 |

FOREIGN PATENT DOCUMENTS

| | | |
|---|---|---|
| CN | 104885097 A | 9/2015 |
| CN | 104899855 A | 9/2015 |
| CN | 104950313 A | 9/2015 |
| CN | 105627938 A | 6/2016 |
| CN | 105652873 A | 6/2016 |
| CN | 105809130 A | 7/2016 |
| CN | 105866779 A | 8/2016 |
| CN | 106503653 A | 3/2017 |
| CN | 107636680 A | 1/2018 |
| CN | 107995962 A | 5/2018 |
| CN | 108021862 A | 5/2018 |
| CN | 108037514 A | 5/2018 |
| CN | 108427124 A | 8/2018 |
| JP | 2009139323 A | 6/2009 |
| JP | 2010071942 A | 4/2010 |
| JP | 2010287156 A | 12/2010 |
| JP | 2011185777 A | 9/2011 |
| JP | 2012083157 A | 4/2012 |
| JP | 2012221456 A | 11/2012 |
| JP | 2012225806 A | 11/2012 |
| JP | 2013156718 A | 8/2013 |
| JP | 2013218396 A | 10/2013 |
| JP | 2014173869 A | 9/2014 |
| JP | 2017117038 A | 6/2017 |
| JP | 2017166866 A | 9/2017 |
| JP | 2018092483 A | 6/2018 |
| JP | 2018141759 A | 9/2018 |
| JP | 2018534647 A | 11/2018 |
| KR | 20100066952 A | 6/2010 |
| WO | WO 2013035612 A1 | 3/2013 |
| WO | WO 2017158952 A1 | 9/2017 |

OTHER PUBLICATIONS

Chinese Patent Application No. 201811131724.4 Office Action dated Aug. 26, 2020, 7 pages.
Japanese Patent Application No. 2019-177513 English translation of Office Action dated Sep. 8, 2020, 7 pages.
Japanese Patent Application No. 2019-177513 Office Action dated Sep. 8, 2020, 7 pages.
Chinese Patent Application No. 201811131724.4 Office Action dated Apr. 27, 2020, 7 pages.
Chinese Patent Application No. 201811131724.4 English translation of Office Action dated Apr. 27, 2020, 10 pages.
Moghadam, P. et al., Improving Path Planning and Mapping Based on Stereo Vision and Lidar, 10TH International Conference on, IEEE, Piscataway, NJ, USA, Dec. 17, 2008 (Dec. 17, 2008), pp. 384-389.
Schneider, S. et al., Fusing Vision and LIDAR-Synchronization, Correction and Occlusion Reasoning, Intelligent Vehicles Symposium (IV), 2010 IEEE, Piscataway, NJ, USA, Jun. 21, 2010 (Jun. 21, 2010), pp. 388-393.
European Patent Application No. 19196628.2 extended Search and Opinion dated Mar. 4, 2020, 10 pages.
Japanese Patent Application No. 2019-177513 Office Action dated Dec. 22, 2020, 5 pages.
Japanese Patent Application No. 2019-177513 English translation of Office Action dated Dec. 22, 2020, 5 pages.

* cited by examiner

METHOD AND APPARATUS FOR DETECTING OBSTACLE, ELECTRONIC DEVICE, VEHICLE AND STORAGE MEDIUM

CROSS REFERENCE TO RELATED APPLICATION

This application claims priority and benefits to Chinese Application No. 201811131724.4, filed on Sep. 27, 2018, the entire content of which is incorporated herein by reference.

FIELD

The present disclosure relates to a field of autonomous vehicle technology, and more particularly, to a method and an apparatus for detecting an obstacle, an electronic device, a vehicle and a storage medium.

BACKGROUND

Autonomous vehicle refers to a vehicle capacity of sensing a surrounding environment by various sensors and controlling steering and velocity of the vehicle according to sensed road, vehicle position, obstacle, and the like, thereby allowing the vehicle to safely and reliably travel on the road. The obstacle may include a stone pier, a ball, a fire hydrant existing on the road.

SUMMARY

Embodiments of the present disclosure provide a method for detecting an obstacle. The method includes:
obtaining a depth map around a vehicle;
performing a terrain fitting based on the depth map to determine a terrain equation;
determining a set of candidate obstacle points based on the terrain equation and the depth map;
clustering candidate obstacle points in the set of candidate obstacle points to obtain at least one independent obstacle; and
identifying and filtering a falsely detected obstacle from the at least one independent obstacle to obtain a depth-map-based obstacle detection result.

Embodiments of the present disclosure provide an electronic device. The electronic device includes:
one or more processors; and
a memory configured to store one or more programs,
in which when the one or more programs are executed by the one or more processors, the one or more processors are caused to perform the method for detecting an obstacle according to any of embodiments of the present disclosure.

Embodiments of the present disclosure provide a computer readable storage medium, having computer programs stored thereon. When the computer programs are executed by a processor, the processor is configured to execute the method for detecting an obstacle according to any of embodiments of the present disclosure.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

Monocular camera and laser radar are both sensors for an autonomous vehicle system. By sensing the surrounding environment of the vehicle with these sensors, obstacle detection, obstacle classification, and obstacle tracking may be performed. These sensors have respective advantages and limitations respectively.

The obstacle detection with the monocular camera may be generally performed by machine learning. A conventional obstacle clearly defined may be collected and manually annotated, for example, a person, a vehicle, a bicycle, a cone barrel, and the like. Samples annotated may be trained by using a machine learning algorithm to obtain a detection model. The conventional obstacle in a real image may be detected by detection model. A disadvantage of the above method may be failure to detect an unconventional obstacle that is never trained. On a real road, it is unable to obtain an exhaustive list of types of the unconventional obstacle in a travelable region. A non-exhaustive list of unconventional obstacles may include various roadblocks in a big size, and various odd-shaped stones, mounds, cartons in a small size.

The obstacle detection may be carried out with the laser radar, to detect conventional and unconventional obstacles by utilizing a traditional detection algorithm. However, being limited to the number of radar transmitters, it is unable to ensure to collect dense laser point cloud, such that it is possible to miss to detect a low obstacle. In addition, the laser radar may have different object detection capabilities for different colors and materials. For example, an obstacle made of a black material may absorb too much laser light, which may cause the laser radar to miss to detect the obstacle.

Therefore, none of the above sensors may provide an accurate and effective detection of the unconventional obstacle.

Accordingly, embodiments of the present disclosure provide a method and an apparatus for detecting an obstacle, an electronic device, a vehicle and a storage medium, which may avoid a problem of missed obstacle detection caused by sparse sampling points when using the laser radar for detection. In addition, it may also avoid a problem of missed obstacle detection caused by that an untrained sample type is unable to be detected since it is impossible to train the mode by taking all types of obstacles as samples.

Figure 1:
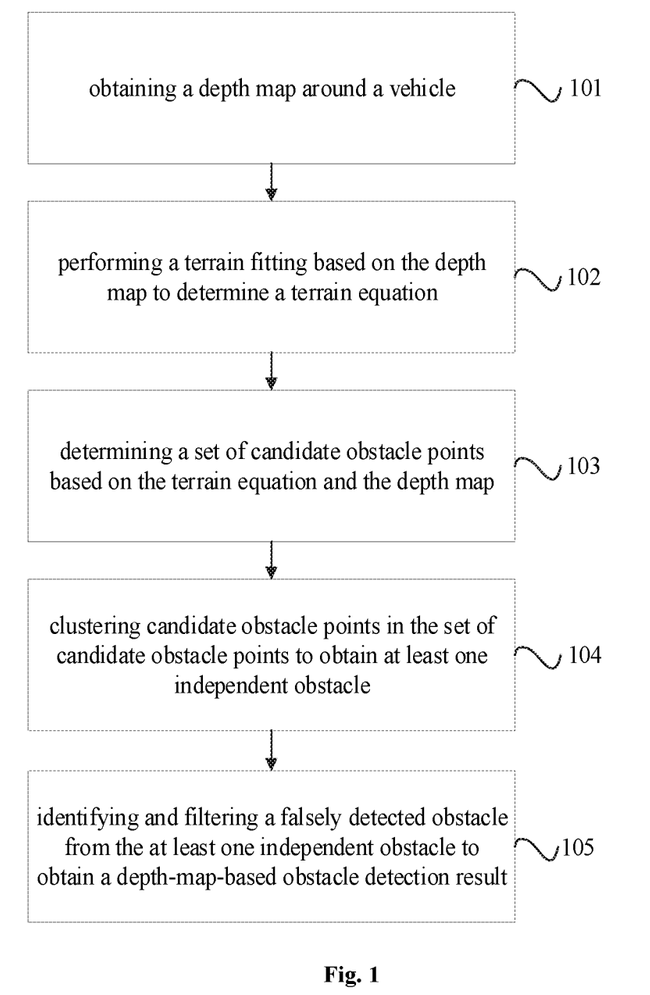
FIG. 1 is a flowchart illustrating a method for detecting an obstacle according to Embodiment 1 of the present disclosure.

FIG. 1 is a flowchart illustrating a method for detecting an obstacle according to embodiments of the present disclosure. The method may be executed by an apparatus for detecting an obstacle or an electronic device. The apparatus or the electronic device may be implemented in hardware and/or software. The apparatus or the electronic device may be integrated in an intelligent device with a network communication function, for example, a vehicle. The vehicle may be an autonomous vehicle. As illustrated in FIG. 1, the method may include the following.

At block 101, a depth map around a vehicle is obtained.

In a computer vision system, three-dimensional (3D) scene information may provide possibilities for various computer vision applications such as an image segmentation, a target detection, an object tracking and the like. The depth map may be widely applied as a common expression mode of the 3D scene information. In a 3D computer graphic, the depth map may be an image or an image channel, containing information about a distance of a surface of a scene object at a viewpoint. The depth map may be similar to a grayscale image, except that each pixel value of the depth map is an actual distance from a sensor to an object. In embodiments of the present disclosure, the electronic device may obtain the depth map around the vehicle. In detail, the electronic device may obtain the depth map around the vehicle using a binocular stereo camera. In some examples, the electronic device may obtain laser point cloud around the vehicle by using a laser radar and obtain the depth map around the vehicle by sampling the laser point cloud around the vehicle through a monocular camera.

At block 102, a terrain fitting is performed based on the depth map to determine a terrain equation.

In embodiments of the present disclosure, the electronic device may perform the terrain fitting based on the depth map to determine the terrain equation. In detail, for a first depth map (or an initial depth map), the electronic device may perform a plane fitting on points projected from a preset region of the depth map onto a 3D space to obtain the terrain equation of the first depth map. For each of other depth maps after the first depth map, the electronic device may determine the terrain equation by performing the plane fitting on points within a travelable region determined based on a previous depth map of a current depth map to obtain the terrain equation of the current depth map.

For example, for the first depth map, the electronic device may perform the plane fitting on the points projected from the preset region of the first depth map onto the 3D space to obtain the terrain equation of the first depth map. For a second depth map, the electronic device may perform the plane fitting on the points within the travelable region determined by the first depth map to obtain the terrain equation of the second depth map. For a third depth map, the electronic device may perform the plane fitting on the points within the travelable region determined by the second depth map to obtain the terrain equation of the third depth map, and so on. For a $N^{th}$ depth map, the electronic device may perform the plane fitting on the points within the travelable region determined by a $N-1^{th}$ depth map to obtain the terrain equation of the $N^{th}$ depth map, where N is a natural number greater than 1.

At block 103, a set of candidate obstacle points is determined based on the terrain equation and the depth map.

In embodiments of the present disclosure, the electronic device may determine the set of candidate obstacle points based on the terrain equation and the depth map. In detail, the electronic device may detect the travelable region in front of the vehicle on the depth map according to the terrain equation. In addition, the electronic device may determine the set of candidate obstacle points within the travelable region on the depth map.

At block 104, candidate obstacle points in the set of candidate obstacle points are clustered to obtain at least one independent obstacle.

In embodiments of the present disclosure, the electronic device may cluster the candidate obstacle points in the set of candidate obstacle points to obtain the at least one independent obstacle. In detail, the electronic device may cluster the candidate obstacle points in the set of candidate obstacle points using a clustering algorithm to obtain at least one clustering result and determine the at least one clustering result as the at least one independent obstacle respectively. In detail, the electronic device may cluster the candidate obstacle points in the set of candidate obstacle points using the clustering algorithm. For example, the electronic device may divide regions of the candidate obstacle points to obtain at least one candidate region corresponding to the candidate obstacle points. In addition, the electronic device may cluster the candidate obstacle points in each candidate region. For example, in response to determining that the candidate obstacle points in a candidate region are relatively concentrated, the electronic device may cluster the candidate obstacle points in the candidate region to obtain an independent obstacle of the candidate region.

At block 105, a falsely detected obstacle is identified and filtered from the at least one independent obstacle to obtain a depth-map-based obstacle detection result.

In embodiments of the present disclosure, the electronic device may identify and filter the falsely detected obstacle from the at least one independent obstacle to obtain the depth-map-based obstacle detection result. In detail, the electronic device may identify the falsely detected obstacle from the at least one independent obstacle according to a preset strategy. The preset strategy at least may include identifying the falsely detected obstacle based on a height of the obstacle relative to a ground, identifying the falsely detected obstacle based on a size of the obstacle, and identifying the falsely detected obstacle based on a current lane line of the vehicle.

For example, the electronic device clusters the candidate obstacle points in the set of candidate obstacle points to obtain M independent obstacles, including an independent obstacle 1, an independent obstacle 2, . . . , and an independent obstacle M, where M is a natural number greater than or equal to 1. In an example, the electronic equipment may respectively identify the independent obstacle 1, the independent obstacle 2, . . . , and the independent obstacle M according to the height of each independent obstacle relative to the ground. In another example, the electronic device may respectively identify the independent obstacle 1, the independent obstacle 2, . . . , and the independent obstacle M according to the size of each independent obstacle. In still another example, the electronic device may respectively identify the independent obstacle 1, the independent obstacle 2, . . . , and the independent obstacle M according to the current lane line of the vehicle. For example, when the height of the independent obstacle 1 from the ground is lower than a preset height threshold, the electronic device may identify the independent obstacle 1 as the falsely detected obstacle. In response to detecting that the size of the independent obstacle 1 is smaller than a preset size threshold, the electronic device may identify the independent obstacle 1 as the falsely detected obstacle. In response to detecting that the independent obstacle 1 is outside the current lane line of the vehicle, the electronic device may identify the independent obstacle 1 as the falsely detected obstacle.

With the method for detecting the obstacle according to embodiments of the present disclosure, the depth map around the vehicle may be obtained, the terrain fitting may be performed based on the depth map to determine the terrain equation, the set of candidate obstacle points may be determined based on the terrain equation and the depth map, the candidate obstacle points in the set of candidate obstacle points may be clustered to obtain at least one independent obstacle, and the falsely detected obstacle may be identified and filtered from the at least one independent obstacle to obtain the depth-map-based obstacle detection result. That is, in the technical solution of the present disclosure, the set of candidate obstacle points may be determined based on the terrain equation and the depth map, by clustering the candidate obstacle points in the set of candidate obstacle points and by filtering the falsely detected obstacle from the at least one independent obstacle, the depth-map-based obstacle detection result may be obtained. Thus, compared with the related art, with the method for detecting the obstacle according to embodiments of the present disclosure, it may be able to avoid a problem of missed obstacle detection caused by sparse sampling points when using the laser radar for detection. In addition, it may be also able to avoid a problem of missed obstacle detection caused by that an untrained sample type is unable to be detected since it is impossible to train the mode by taking all types of obstacles as samples. Moreover, the technical solution of embodiments of the present disclosure may be simple and convenient to realize, convenient to popularize and have a wide application range.

Figure 2:
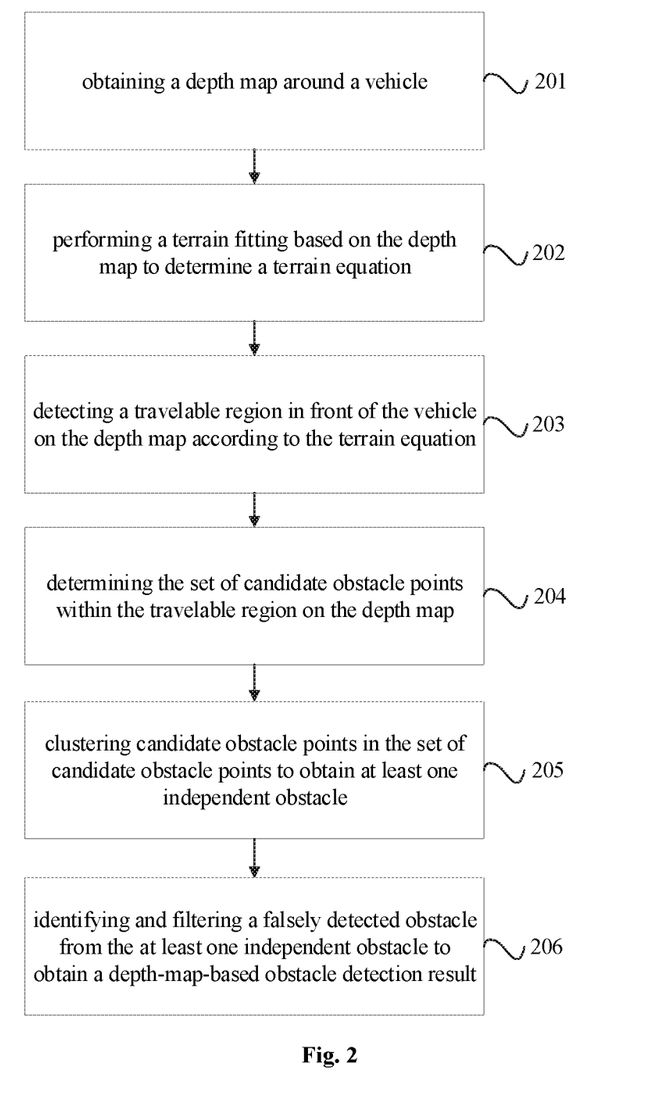
FIG. 2 is a flowchart illustrating a method for detecting an obstacle according to Embodiment 2 of the present disclosure.

FIG. 2 is a flowchart illustrating a method for detecting an obstacle according to embodiments of the present disclosure. As illustrated in FIG. 2, the method may include the following.

At block 201, the depth map around the vehicle is obtained.

At block 202, the terrain fitting is performed based on the depth map to determine the terrain equation.

At block 203, the travelable region in front of the vehicle on the depth map is detected according to the terrain equation.

In embodiments of the present disclosure, the electronic device may detect the travelable region in front of the vehicle on the depth map according to the terrain equation. That is, after the electronic device obtains the depth map around the vehicle, the electronic device may detect the travelable region and a non-travelable region in front of the vehicle on the depth map. In detail, the electronic device may calculate a touchdown point of the obstacle on the depth map based on the terrain equation, and determine a region within a depth of the touchdown point as the travelable region, and determine a region outside the depth of the touchdown point as the non-travelable region. The touchdown point may be an intersection point of a low section of the obstacle and the terrain equation.

At block 204, the set of candidate obstacle points within the travelable region on the depth map is determined.

In embodiments of the present disclosure, the electronic device may determine the set of candidate obstacle points within the travelable region on the depth map. In detail the electronic device may determine, on the depth map corresponding to the travelable region, a point above the touchdown point and complying with a rule as a pixel point of the obstacle. The rule may be that a different among depth values of all pixel points of the obstacle is within a preset range. The electronic device may determine an edge of the obstacle in response to determining that a different among depth values of pixel points go beyond the preset range. That is, the depth values of all the pixel points of the obstacle are changed within the preset range, and the large change in depth values may occur at the edge of the obstacle. Thus, the electronic device may determine the edge of the obstacle in response to determining that the different among depth values of pixel points go beyond the preset range.

At block 205, the candidate obstacle points in the set of candidate obstacle points are clustered to obtain the at least one independent obstacle.

At block 206, the falsely detected obstacle is identified and filtered from the at least one independent obstacle to obtain the depth-map-based obstacle detection result.

In embodiments of the present disclosure, after the falsely detected obstacle is identified from the at least one independent obstacle by the electronic device, the electronic device may filter the falsely detected obstacle from the at least one independent obstacle. In detail, the electronic device may filter the falsely detected obstacle from the at least one independent obstacle using a preset filtering algorithm.

In some examples, in embodiments of the present disclosure, while obtaining the depth map around the vehicle by the electronic device, the electronic device may further obtain data via a laser radar by scanning around the vehicle and perform an obstacle detection based on the data obtained by the laser radar to obtain an obstacle detection result of the laser radar. After obtaining the depth-map-based obstacle detection result by the electronic device, the electronic device may further perform a fusion cross verification according to the obstacle detection result of the laser radar and the depth-map-based obstacle detection result. The laser point cloud may be also referred as point cloud. A set of mass points describing a spatial distribution and surface characteristics of an object may be obtained by obtaining a spatial coordinate of each sampling point on a surface of the object by using laser under a same spatial reference system. The set of mass points may be called as the point cloud. Attributes of the point cloud may include: a spatial resolution, a point location accuracy, a surface normal vector, and the like. For example, the laser radar may be disposed on the vehicle. The laser radar may include multiple laser emitters provided thereon. The laser radar may scan around the vehicle circle by circle according to a certain frequency to obtain the laser point cloud around the vehicle in real time. Thus, the electronic device may perform the fusion cross verification according to the obstacle detection result of the laser radar and the depth-map-based obstacle detection result. In detail, the electronic device may determine a target obstacle based on the depth-map-based obstacle detection result. In response to determining that the obstacle detection result of the laser radar contains a part of the target obstacle, it may be determined that the target obstacle passes the fusion cross verification. In response to determining that the obstacle detection result of the laser radar does not contain the target obstacle, it may be determined that the target obstacle passes the fusion cross verification in a case where two target obstacles detected at two adjacent time points are able to associate with each other in time sequence based on the depth map. In detail, for determining whether two target obstacles detected at two adjacent time points are able to associate with each other in time sequence, the electronic device may extract features from images of the two target obstacles respectively using a machine learning method to obtain respective two feature vectors, and judge whether the two target obstacles are associate with each other by calculating a similarity between two feature vectors.

With the method for detecting the obstacle according to embodiments of the present disclosure, the depth map around the vehicle may be obtained, and the terrain fitting may be performed based on the depth map to determine the terrain equation, the set of candidate obstacle points may be determined based on the terrain equation and the depth map, the candidate obstacle points in the set of candidate obstacle points may be clustered to obtain at least one independent obstacle, and the falsely detected obstacle may be identified and filtered from the at least one independent obstacle to obtain the depth-map-based obstacle detection result. That is, in the technical solution of the present disclosure, the set of candidate obstacle points may be determined based on the terrain equation and the depth map, by clustering the candidate obstacle points in the set of candidate obstacle points and by filtering the falsely detected obstacle from the at least one independent obstacle, the depth-map-based obstacle detection result may be obtained. Thus, compared with the related art, with the method for detecting the obstacle provided by embodiments of the present disclosure, it may be able to avoid a problem of missed obstacle detection caused by sparse sampling points when using the laser radar for detection. In addition, it may be also able to avoid a problem of missed obstacle detection caused by that an untrained sample type is unable to be detected since it is impossible to train the mode by taking all types of obstacles as samples. Moreover, the technical solution of embodiments of the present disclosure may be simple and convenient to realize, convenient to popularize and have a wide application range.

Figure 3:
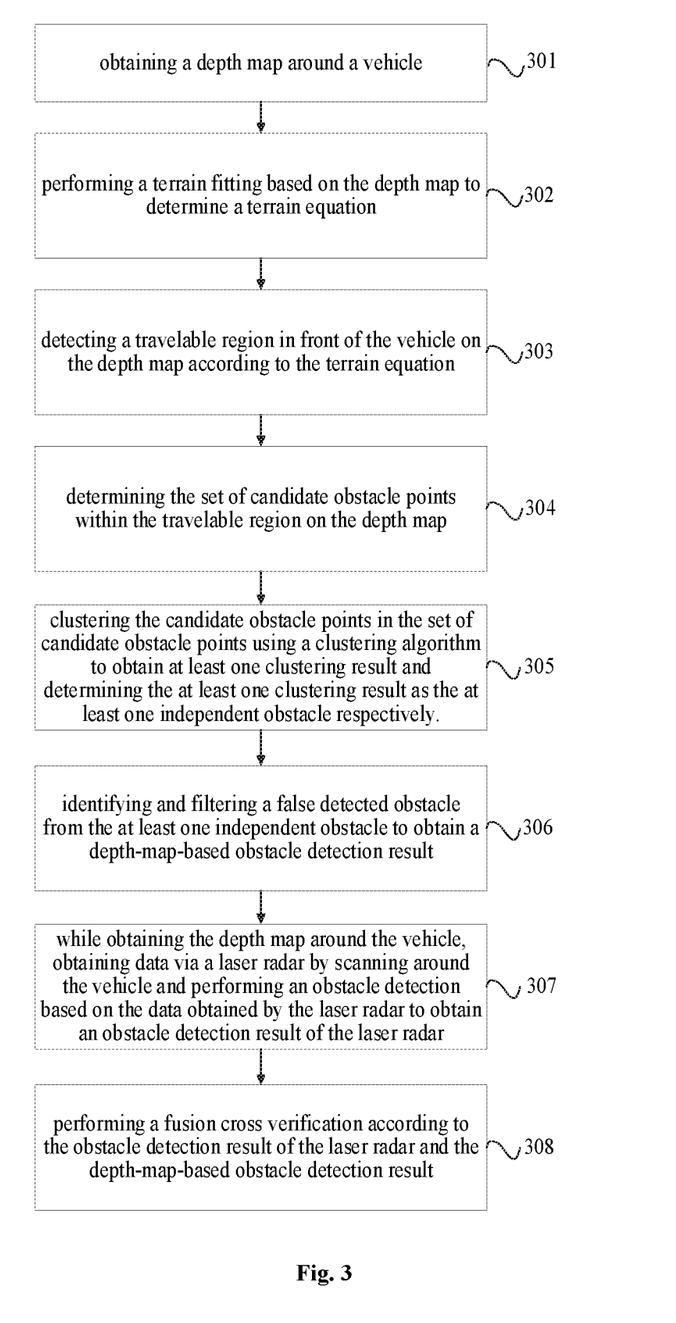
FIG. 3 is a flowchart illustrating a method for detecting an obstacle according to Embodiment 3 of the present disclosure.

FIG. 3 is a flowchart illustrating a method for detecting an obstacle according to embodiments of the present disclosure. As illustrated in FIG. 3, the method may include the following.

At block 301, the depth map around the vehicle is obtained.

At block 302, the terrain fitting is performed based on the depth map to determine the terrain equation.

At block 303, the travelable region in front of the vehicle on the depth map is detected according to the terrain equation.

At block 304, the set of candidate obstacle points within the travelable region on the depth map is determined.

At block 305, the candidate obstacle points in the set of candidate obstacle points are clustered using the clustering algorithm to obtain the at least one clustering result and the at least one clustering result is determined as the at least one independent obstacle respectively.

At block 306, the falsely detected obstacle is identified and filtered from the at least one independent obstacle to obtain the depth-map-based obstacle detection result.

At block 307, while obtaining the depth map around the vehicle, data is obtained via the laser radar by scanning around the vehicle and the obstacle detection is performed based on the data obtained by the laser radar to obtain the obstacle detection result of the laser radar.

At block 308, the fusion cross verification is performed according to the obstacle detection result of the laser radar and the depth-map-based obstacle detection result.

In embodiments of the present disclosure, the electronic device may determine the target obstacle based on the depth-map-based obstacle detection result. In response to determining that the obstacle detection result of the laser radar contains a part of the target obstacle, it may be determined that the target obstacle passes the fusion cross verification, In response to determining that the obstacle detection result of the laser radar does not contain the target obstacle, it may be determined that the target obstacle passes the fusion cross verification in a case where two target obstacles detected at two adjacent time points are able to associate with each other in time sequence based on the depth map. In detail, for determining whether the two target obstacles detected at the two adjacent time points are able to associate with each other in time sequence, the electronic device may extract the features from the images of the two target obstacles respectively using the machine learning method to obtain the respective two feature vectors, and judge whether the two target obstacles are associate with each other through calculating the similarity between the two feature vectors. In detail, in response to determining that the similarity between the two feature vectors is greater than or equal to a preset threshold, the electronic device may determine that the two obstacles are associated with each other. In response to determining that the similarity between the two feature vectors is smaller than the preset threshold, the electronic device may determine that the two obstacles are not associated with each other.

With the method for detecting the obstacle according to embodiments of the present disclosure, the depth map around the vehicle may be obtained, the terrain fitting may be performed based on the depth map to determine the terrain equation, the set of candidate obstacle points may be determined based on the terrain equation and the depth map, the candidate obstacle points in the set of candidate obstacle points may be clustered to obtain at least one independent obstacle, and the falsely detected obstacle may be identified and filtered from the at least one independent obstacle to obtain the depth-map-based obstacle detection result. That is, in the technical solution of the present disclosure, the set of candidate obstacle points may be determined based on the terrain equation and the depth map, by clustering the candidate obstacle points in the set of candidate obstacle points and by filtering the falsely detected obstacle from the at least one independent obstacle, the depth-map-based obstacle detection result may be obtained. Thus, compared with the related art, with the method for detecting the obstacle according to embodiments of the present disclosure, it may be able to avoid a problem of missed obstacle detection caused by sparse sampling points when using the laser radar for detection. In addition, it may be also able to avoid a problem of missed obstacle detection caused by that an untrained sample type is unable to be detected since it is impossible to train the mode by taking all types of obstacles as samples. Moreover, the technical solution of embodiments of the present disclosure may be simple and convenient to realize, convenient to popularize and have a wide application range.

Figure 4:
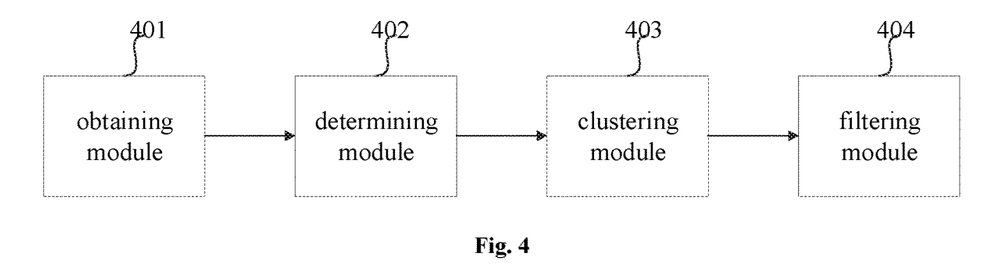
FIG. 4 is a block diagram illustrating an apparatus for detecting an obstacle according to Embodiment 4 of the present disclosure.

FIG. 4 is a block diagram illustrating an apparatus for detecting an obstacle according to embodiments of the present disclosure. As illustrated in FIG. 4, the apparatus may include an obtaining module 401, a determining module 402, a clustering module 403, and a filtering module 404.

The obtaining module 401 may be configured to obtain a depth map around a vehicle.

The determining module 402 may be configured to perform a terrain fitting based on the depth map to determine a terrain equation, and determine a set of candidate obstacle points based on the terrain equation and the depth map.

The clustering module 403 may be configured to cluster candidate obstacle points in the set of candidate obstacle points to obtain at least one independent obstacle.

The filtering module 404 may be configured to identify and filter a falsely detected obstacle from the at least one independent obstacle to obtain a depth-map-based obstacle detection result.

The apparatus for detecting the obstacle may execute the method according to any of embodiments of the present disclosure, and have corresponding functional modules for executing the method and beneficial effects. The technical details not described in detail in the embodiment may be referred to the method for detecting the obstacle provided by any of embodiments of the present disclosure.

Figure 5:
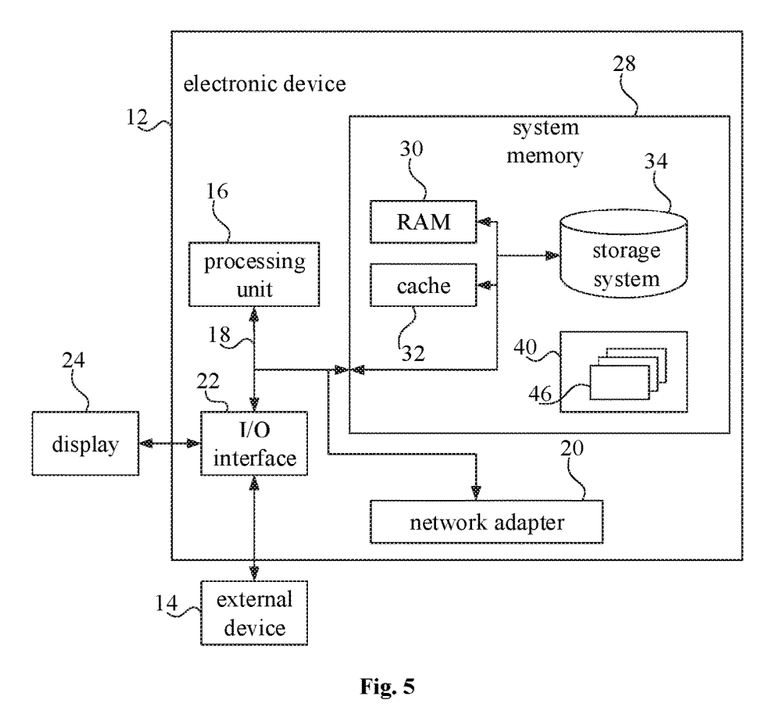
FIG. 5 is a block diagram illustrating an electronic device according to Embodiment 5 of the present disclosure.

FIG. 5 is a block diagram illustrating an electronic device according to embodiments of the present disclosure. A block diagram illustrating an exemplary electronic device 12 for according to implementations of the present disclosure is illustrated in FIG. 5. The electronic device 12 illustrated in FIG. 5 is only illustrated as an example, and should not be considered as any restriction on the function and the usage range of embodiments of the present disclosure.

As illustrated in FIG. 5, the electronic device 12 is in the form of a general-purpose computing apparatus. The electronic device 12 may include, but is not limited to, one or more processors or processing units 16, a system memory 28, and a bus 18 connecting different system components (including the system memory 28 and the processing unit 16).

The bus 18 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the electronic device 12 may include multiple kinds of computer-readable media. These media may be any storage media accessible by the electronic device 12, including transitory or non-transitory storage medium and movable or unmovable storage medium.

The memory 28 may include a computer-readable medium in a form of volatile memory, such as a random access memory (RAM) 30 and/or a high-speed cache memory 32. The electronic device 12 may further include other transitory/non-transitory storage media and movable/unmovable storage media. In way of example only, the storage system 34 may be used to read and write non-removable, non-volatile magnetic media (not shown in the figure, commonly referred to as "hard disk drives"). Although not illustrated in FIG. 5, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 18 via one or more data medium interfaces. The memory 28 may include at least one program product, which has a set of (for example at least one) program modules configured to perform the functions of embodiments of the present disclosure.

A program/application 40 with a set of (at least one) program modules 42 may be stored in memory 28, the program modules 42 may include, but not limit to, an operating system, one or more application programs, other program modules and program data, and any one or combination of above examples may include an implementation in a network environment. The program modules 42 are generally configured to implement functions and/or methods described in embodiments of the present disclosure.

The electronic device 12 may also communicate with one or more external devices 14 (e.g., a keyboard, a pointing device, a display 24, and etc.) and may also communicate with one or more devices that enables a user to interact with the electronic device 12, and/or any device (e.g., a network card, a modem, and etc.) that enables the electronic device 12 to communicate with one or more other computing devices. This kind of communication can be achieved by the input/output (I/O) interface 22. In addition, the electronic device 12 may be connected to and communicate with one or more networks such as a local area network (LAN), a wide area network (WAN) and/or a public network such as the Internet through a network adapter 20. As illustrated in FIG. 5, the network adapter 20 communicates with other modules of the electronic device 12 over bus 18. It should be understood that although not shown in the figure, other hardware and/or software modules may be used in combination with the electronic device 12, which including, but not limited to, microcode, device drivers, redundant processing units, external disk drive arrays, RAID systems, tape drives, as well as data backup storage systems and the like.

The processing unit 16 can perform various functional applications and data processing by running programs stored in the system memory 28, for example, to perform the method for detecting the obstacle according to embodiments of the present disclosure.

Embodiments of the present disclosure provides a computer storage medium.

The computer storage medium of embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for detecting an obstacle, comprising:
    obtaining a depth map around a vehicle;
    performing a terrain fitting based on the depth map to determine a terrain equation;
    determining a set of candidate obstacle points based on the terrain equation and the depth map;
    clustering candidate obstacle points in the set of candidate obstacle points to obtain at least one independent obstacle; and
    identifying and filtering a falsely detected obstacle from the at least one independent obstacle to obtain a depth-map-based obstacle detection result;
    wherein determining the set of candidate obstacle points based on the terrain equation and the depth map comprises: detecting a travelable region in front of the vehicle on the depth map according to the terrain equation; and determining the set of candidate obstacle points within the travelable region on the depth map;
    wherein performing the terrain fitting based on the depth map to determine the terrain equation comprises: for a first depth map, performing a plane fitting on points projected from a preset region of the depth map onto a three-dimensional space to obtain the terrain equation of the first depth map; and for each of other depth maps after the first depth map, determining the terrain equation by performing the plane fitting on points within the travelable region determined based on a previous depth map of a current depth map to obtain the terrain equation of the current depth map.

2. The method of claim 1, wherein obtaining the depth map around the vehicle comprises:
    obtaining the depth map around the vehicle using a binocular stereo camera; or
    obtaining a laser point cloud around the vehicle using a laser radar, sampling the laser point cloud around the vehicle by a monocular camera to obtain the depth map around the vehicle.

3. The method of claim 1, wherein detecting the travelable region in front of the vehicle on the depth map according to the terrain equation comprises:
    calculating a touchdown point of the obstacle on the depth map based on the terrain equation, and determining a region within a depth of the touchdown point as the travelable region, the touchdown point being an intersection point of the obstacle and the terrain equation.

4. The method of claim 1, wherein determining the set of candidate obstacle points within the travelable region on the depth map comprises:
    determining, on the depth map corresponding to the travelable region, a point above a touchdown point and complying with a rule as a pixel point of the obstacle; the rule being that a difference among depth values of all pixel points of the obstacle is within a preset range; and
    determining an edge of the obstacle in response to determining that a different between depth values of pixel points go beyond the preset range.

5. The method of claim 1, wherein clustering the candidate obstacle points in the set of candidate obstacle points to obtain the at least one independent obstacle comprises:
    clustering the candidate obstacle points in the set of candidate obstacle points using a clustering algorithm to obtain at least one clustering result and determining the at least one clustering result as the at least one independent obstacle respectively.

6. The method of claim 1, wherein identifying the falsely detected obstacle from the at least one independent obstacle comprises:
    identifying the falsely detected obstacle from the at least one independent obstacle according to a preset strategy; the preset strategy at least comprising identifying the falsely detected obstacle based on a height of the obstacle relative to a ground, identifying the falsely detected obstacle based on a size of the obstacle, and identifying the falsely detected obstacle based on a current lane line of the vehicle.

7. The method of claim 1, further comprising:
    while obtaining the depth map around the vehicle, obtaining data via a laser radar by scanning around the vehicle and performing an obstacle detection based on the data obtained by the laser radar to obtain an obstacle detection result of the laser radar; and
    after obtaining the depth-map-based obstacle detection result, further comprising:
    performing a fusion cross verification according to the obstacle detection result of the laser radar and the depth-map-based obstacle detection result.

8. The method of claim 7, wherein performing the fusion cross verification according to the obstacle detection result of the laser radar and the depth-map-based obstacle detection result comprises:
    determining a target obstacle based on the depth-map-based obstacle detection result;
    in response to determining that the obstacle detection result of the laser radar contains a part of the target obstacle, determining that the target obstacle passes the fusion cross verification; and
    in response to determining that the obstacle detection result of the laser radar does not contain the target obstacle, determining that the target obstacle passes the fusion cross verification in a case where two target obstacles detected at two adjacent time points are able to associate with each other in time sequence based on the depth map.

9. The method of claim 8, wherein determining that the two target obstacles detected at the two adjacent time points are able to associate with each other in the time sequence comprises:
extracting features from images of the two target obstacles respectively using a machine learning method to obtain respective two feature vectors, judging whether the two target obstacles are associate with each other through calculating a similarity between the two feature vectors.

10. An electronic device, comprising:
one or more processors; and
a memory configured to store one or more programs,
wherein when the one or more programs are executed by the one or more processors, the one or more processors are caused to
obtain a depth map around a vehicle;
perform a terrain fitting based on the depth map to determine a terrain equation;
determine a set of candidate obstacle points based on the terrain equation and the depth map;
cluster candidate obstacle points in the set of candidate obstacle points to obtain at least one independent obstacle; and
identify and filter a falsely detected obstacle from the at least one independent obstacle to obtain a depth-map-based obstacle detection result;
wherein the one or more processors are caused to:
detect a travelable region in front of the vehicle on the depth map according to the terrain equation; and determine the set of candidate obstacle points within the travelable region on the depth map; and
for a first depth map, perform a plane fitting on points projected from a preset region of the depth map onto a three-dimensional space to obtain the terrain equation of the first depth map; and
for each of other depth maps after the first depth map, determine the terrain equation by performing the plane fitting on points within the travelable region determined based on a previous depth map of a current depth map to obtain the terrain equation of the current depth map.

11. The electronic device of claim 10, wherein the one or more processors are caused to obtain the depth map around the vehicle by:
obtaining the depth map around the vehicle using a binocular stereo camera; or
obtaining a laser point cloud around the vehicle using a laser radar, sampling the laser point cloud around the vehicle by a monocular camera to obtain the depth map around the vehicle.

12. The electronic device of claim 10, wherein the one or more processors are caused to detect the travelable region in front of the vehicle on the depth map according to the terrain equation by:
calculating a touchdown point of the obstacle on the depth map based on the terrain equation, and determining a region within a depth of the touchdown point as the travelable region, the touchdown point being an intersection point of the obstacle and the terrain equation.

13. The electronic device of claim 10, wherein the one or more processors are caused to determine the set of candidate obstacle points within the travelable region on the depth map by:
determining, on the depth map corresponding to the travelable region, a point above a touchdown point and complying with a rule as a pixel point of the obstacle; the rule being that a difference among depth values of all pixel points of the obstacle is within a preset range; and
determining an edge of the obstacle in response to determining that a different between depth values of pixel points go beyond the preset range.

14. The electronic device of claim 10, wherein the one or more processors are caused to cluster the candidate obstacle points in the set of candidate obstacle points to obtain the at least one independent obstacle by:
clustering the candidate obstacle points in the set of candidate obstacle points using a clustering algorithm to obtain at least one clustering result and determining the at least one clustering result as the at least one independent obstacle respectively.

15. The electronic device of claim 10, wherein the one or more processors are caused to identify the falsely detected obstacle from the at least one independent obstacle by:
identifying the falsely detected obstacle from the at least one independent obstacle according to a preset strategy; the preset strategy at least comprising identifying the falsely detected obstacle based on a height of the obstacle relative to a ground, identifying the falsely detected obstacle based on a size of the obstacle, and identifying the falsely detected obstacle based on a current lane line of the vehicle.

16. A non-transitory computer readable storage medium, stored thereon with computer programs that, when executed by a processor, cause the processor to perform:
obtaining a depth map around a vehicle;
performing a terrain fitting based on the depth map to determine a terrain equation;
determining a set of candidate obstacle points based on the terrain equation and the depth map;
clustering candidate obstacle points in the set of candidate obstacle points to obtain at least one independent obstacle; and
identifying and filtering a falsely detected obstacle from the at least one independent obstacle to obtain a depth-map-based obstacle detection result;
the processor is caused to:
detect a travelable region in front of the vehicle on the depth map according to the terrain equation; and determine the set of candidate obstacle points within the travelable region on the depth map; and
for a first depth map, perform a plane fitting on points projected from a preset region of the depth map onto a three-dimensional space to obtain the terrain equation of the first depth map; and
for each of other depth maps after the first depth map, determine the terrain equation by performing the plane fitting on points within the travelable region determined based on a previous depth map of a current depth map to obtain the terrain equation of the current depth map.

* * * * *